Aug. 24, 1954     H. R. FEICHTER     2,687,147

ORIFICE CONSTRUCTION

Filed March 29, 1949

INVENTOR.
Harold R. Feichter
BY Frease and Bishop
ATTORNEYS

Patented Aug. 24, 1954

2,687,147

UNITED STATES PATENT OFFICE 2,687,147

ORIFICE CONSTRUCTION

Harold R. Feichter, Canton, Ohio, assignor to United States Quarry Tile Company, Canton, Ohio, a corporation of Delaware Application March 29, 1949, Serial No. 84,044

6 Claims. (Cl. 138—44)

The invention or discovery relates to orifice construction generally, such as orifices for use in equipment such as sand blast nozzles, spray nozzles, jets for synthetic silk production, and the like, and particularly to metering orifices for use in controlling the flow of oil from oil wells.

In many oil fields, it is required by law to control the flow of oil from each oil well. The oil flowing from an oil well usually contains particles of sand. When a sand bearing stream of oil flows through a metering orifice, there is an abrasive action on the bore of the orifice which results in wear and enlargement of the bore, and a consequent increase in the rate of flow beyond that permitted in the particular oil field.

In usual metering orifices particularly designed for controlling the flow of oil from oil wells, relatively hard materials have been used, such as alloy steels, tungsten carbide, corundum, and substantially chemically pure alumina, but the pressure and velocity of the sand particles in a stream of oil flowing through a metering orifice made of such a hard material produces a rate of wear and enlargement of the bore of the orifice which necessitates frequent replacement of the orifice at a considerable cost.

The objects of the present invention or discovery include the provision of an improved orifice construction, particularly adapted for use as a metering orifice for controlling the flow of sand bearing oil from an oil well, which is adapted by the form, arrangement, and constitution of its parts for a reduction in the rate of wear and enlargement of the bore of the orifice as compared with that of a usual metering orifice.

The foregoing and other objects are attained by the orifice construction, parts, combinations, and sub-combinations, which comprise the present invention or discovery, the nature of which is set forth in the following general statement, and preferred embodiments of which together with their mode of use are set forth by way of example in the following description, and which are particularly and distinctly pointed out and set forth in the appended claims forming part hereof.

The nature of one preferred embodiment of the improved orifice construction of the present invention or discovery may be stated in general terms as including a metering orifice rotor preferably made of fired ceramic material, and preferably having formed therein a plurality of metering orifice bores.

The metering orifice rotor preferably includes an inner member and an outer tubular member, the inner member having the metering orifice bores formed therein, and the inner member consisting of a densified mass of preferably twice fired ceramic material on which the outer tubular member is shrunk, the outer tubular member consisting of a mass of preferably single fired ceramic material which after forming is fitted on the inner member after a first firing of the inner member, and the inner and outer members being then subject to the second firing of the inner member and the first firing of the outer member.

Preferably a plurality of bearing members each consisting of a mass of fired ceramic material form a radial and double thrust bearing for the metering orifice rotor, and preferably metal members form a housing for the bearing members and the rotor mounted therein, the housing members being adapted for connection in the discharge pipe line of an oil well.

By way of example, a number of embodiments of the improved orifice construction and parts of the present invention or discovery are illustrated in the accompanying drawings forming part hereof, in which.

Similar numerals refer to similar parts throughout the several views.

Figure 1:
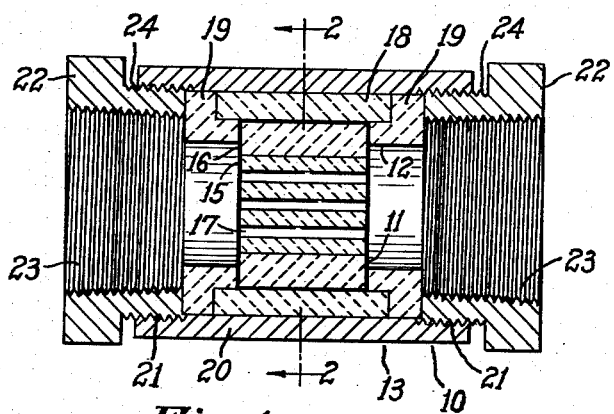
Figure 1 is a longitudinal axial sectional view of one embodiment of the improved orifice construction hereof, as on line 1—1, Figure 2.
Figure 2:
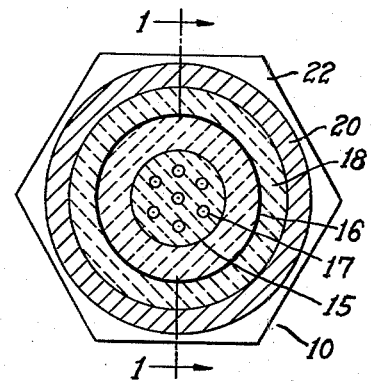
Figure 2 is a transverse sectional view thereof as on line 2—2, Figure 1.

One embodiment of the improved orifice construction hereof is illustrated in Figures 1 and 2 and is indicated generally by 10 and includes a metering orifice rotor indicated generally by 11, a radial and double thrust bearing indicated generally by 12 and in which the rotor 11 is rotatably mounted, and a housing indicated generally by 13 in which the bearing 12 is mounted, the housing 13 being adapted for connection in a pipe line through which is flowing a stream of fluid, such as the discharge pipe line of an oil well.

The metering orifice rotor 11 as shown preferably includes an inner member indicated generally by 15 and an outer member indicated generally by 16. The inner member 15 has formed therein a plurality of metering orifice bores each indicated generally by 17.

As shown, in the orifice construction 10 there are 7 metering orifice bores 17 each having a transverse area A, so that the total transverse area of all of the bores 17 is 7A, which is equal to the transverse area of a single bore having a desired rate of flow of fluid therethrough. However, the total circumferential area or inner cylindrical area of the 7 bores 17 is approximately 3 times the similar area of the equivalent flow single bore metering orifice. Consequently, for any fluid, the wear on the interior cylindric surfaces of the 7 bores 17 is in the neighborhood of ⅓ the wear on the interior cylindric surface of the equivalent flow single bore. In other words the pressure and abrading action p. s. i. for a given total rate of flow through the 7 bores 17 is in the neighborhood of ⅓ the pressure or abrading action p. s. i. in the equivalent flow single bore orifice.

The inner rotor member 15 is preferably made from a compression formed ceramic body which is subsequently subject to two firings. After the first firing, a preferably compression formed ceramic body for the outer tubular member 16 is fitted on the single fired inner rotor member 15, and this combination is then subject to firing after which the inner rotor member 15 consists of a twice fired mass of ceramic material and the outer rotor member 16 consists of a single fired mass of ceramic material shrunk on the inner rotor member and exerting pressure thereon in such manner as to increase the density of the inner rotor member. For any given material, it has been determined that the greater its density, as produced by pressure, heat treatment, or other means, the harder the particular material becomes.

The bearing 12 includes a cylindrical radial bearing tube 18 in which the rotor 11 is rotatable, and each end of the bearing tube 18 extends beyond one of the ends of the orifice rotor 11 and a flanged thrust bearing ring 19 fits in the bore at each end of the bearing tube 18 and provides a thrust bearing for one of the ends of the orifice rotor 11. The tube 18 and rings 19 as shown are made of fired ceramic material.

The housing 13 includes a tube 20 having a bore in which is fitted the bearing 12, each end of the bore of the tube 20 being provided with internal threads 21. A coupling flange 22 having external threads 24 is screwed in each of the internally threaded sleeve ends of the tube 20. Each coupling flange 22 also includes internal pipe threads 23 by the use of which, the orifice construction 10 may be incorporated in a usual pipe line, such as the discharge pipe line of an oil well. The tube 20 and flanges 22 as shown are made of metal such as steel.

Figure 3:
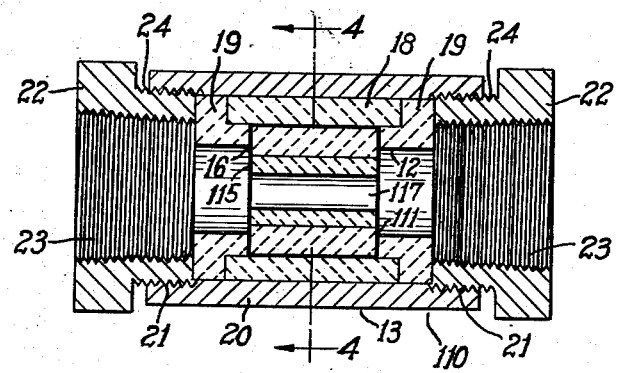
Figure 3 is a longitudinal axial sectional view of a second embodiment of the improved orifice construction hereof, as on line 3—3, Figure 4.
Figure 4:
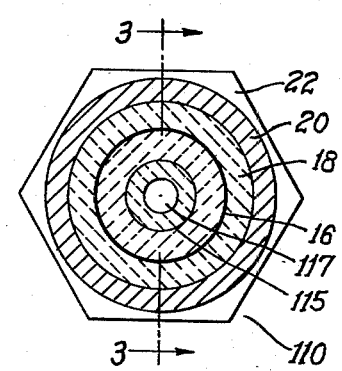
Figure 4 is a transverse sectional view thereof as on line 4—4, Figure 3.

In Figures 3 and 4 there is shown a second embodiment 110 of the improved orifice construction, which includes parts identical in form and constitution with the parts of the orifice construction 10, with the exception that the parts of the orifice construction 110 have different dimensions than the parts of the orifice construction 10, and also in the orifice construction 110 the rotor 111 includes an inner rotor member 115 having a single orifice bore 117 which has a transverse area which may be equal to the sum of the transverse areas of the orifice bores 17 of the orifice construction 10.

The bodies for the inner rotor members 15 and 115, the outer rotor members 16, the bearing tube 18, and the thrust bearing rings 19 are preferably made of powdered or finely ground ceramic material having a high alumina content of upwards of 92 per cent, and also other ingredients, such as set forth in any of my U. S. Letters Patents No. 2,413,441, No. 2,414,367, No. 2,414,368, and No. 2,414,369.

Figure 5:
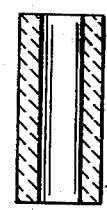
Figure 5 is a longitudinal axial sectional view showing a body of powdered or finely ground ceramic material formed as by pressing as the pre-firing step in the production of one of the inner members of one of the improved orifice rotors.
Figure 6:
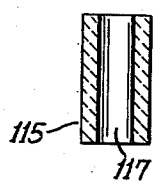
Figure 6 is a view of the inner rotor member after a first firing of the pressure formed body shown in Figure 5.
Figure 7:
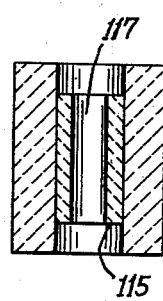
Figure 7 is a similar view showing the single fired inner rotor member on which has been placed a pressure formed body for the outer rotor member.

In Figure 5 there is shown an inner rotor member body 115-1 preferably formed by compressing ground or powdered ceramic material such as above set forth, and before firing. In Figure 6 there is shown the inner rotor member 115 after first firing, the view indicating the shrinkage which takes place when such a body of such a ceramic material is fired to a temperature in the neighborhood of 3,000° F. In Figure 7 the first fired inner rotor member 115 is shown inserted in a preferably compression formed body of ceramic material 16-1 for the outer rotor member.

Figure 8:
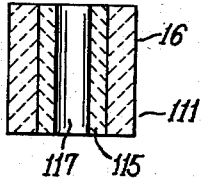
Figure 8 is a view showing the inner and outer rotor members of Figure 7 after a first firing of the outer rotor member and the second firing of the inner rotor member.

After firing the sub-assembly shown in Figure 7 to a temperature in the neighborhood of 3,000° F. and to a point at which the inner first fired rotor member 115 has commenced to soften, the sub-assembly shown in Figure 7 cools and becomes the rotor member 111 shown in Figure 8 including the twice fired inner member 115 and the single fired outer member 16. The firing of the outer member 16 serves to shrink the outer member 16 on the twice fired inner member 115 and to exert pressure of substantial magnitude by the outer member 16 on the inner member 115 sufficient to increase the density of the mass of twice fired ceramic material constituting the inner member 115, and to reduce the diameter of its bore 117 from its diameter in the single fired state as shown in Figure 6.

It is to be noted that the shrinkage of the rotor member bodies 115-1 and 16-1 takes place during firing, and more predominately during the heating up period.

During the second firing of the inner rotor member 115, little or no shrinkage effect from heating is attained, the principal heating effect being to soften the inner member and render it subject to compression.

In the discharge pipe line of a sand bearing oil well, it is understood that the fluid and sand grains have a spiral motion. Consequently, when a stream of such fluid passes either through the multiple bore metering orifice rotor 11, or the single bore metering orifice rotor 111, the spirally directed oil and sand grains will produce rotary motion of the rotor 11 or 111, and thus reduce the rate of wear in the bore 17 or 117 as compared with the rate of wear if either of these orifice rotors were maintained stationary.

The densifying of the mass of twice fired ceramic material constituting the inner rotor members 15 or 115 as above described increases their hardness and resistance to wear as compared with undensified rotor members made of the same ceramic body.

The use of the multiple orifice bores 17, as above described reduces the pressure and abrading action p. s. i. in each of the bores 17 as compared with that of an equivalent flow orifice.

Thus in the improved orifice construction 10 the rate of wear of the orifice bores is reduced in three different ways, as compared with usual orifice construction, and the cumulative effect serves to prolong the period of satisfactory use of the orifice rotors 11 as compared with the period of satisfactory use of usual metering orifices.

In the orifice construction 110, rotary action of the rotor 111 is attained, and increased hardness of the densified inner rotor member 115 is attained, but the multiple orifice effect is not present.

The advantages of a rotary orifice and a multiple hole orifice may be attained in orifice construction of any desired material other than the ceramic compositions above set forth and preferred for attaining the densification of the inner rotor member.

Moreover, the inner rotor member may consist of material other than ceramic material, such as tungsten carbide, or other refractory material, having a composition suitable for compression as described herein.

I claim:

1. In orifice construction, a metering orifice rotor, radial and double thrust bearing means rotatably mounting the rotor, and housing members mounting the bearing means and the housing members including coupling members adapted for connection in a pipe line, and the metering orifice rotor including an inner rotor member and an outer rotor member on the inner rotor member, the outer rotor member exerting pressure on the inner rotor member, and the inner rotor member having formed therein a plurality of metering orifice bores.

2. In orifice construction, a metering orifice rotor, radial and double thrust bearing means rotatably mounting the rotor, and housing members mounting the bearing means and the housing members including coupling members adapted for connection in a pipe line, and the metering orifice rotor including an inner rotor member and an outer rotor member on the inner rotor member, the outer rotor member exerting pressure on the inner rotor member, and the inner rotor member having formed therein a metering orifice bore.

3. In orifice construction, a metering orifice rotor, radial and double thrust bearing means rotatably mounting the rotor, and housing members mounting the bearing means and the housing members including coupling members adapted for connection in a pipe line, and the metering orifice rotor having formed therein a plurality of metering orifice bores, the bearing means including members made of fired ceramic material and the rotor being made of fired ceramic material having a greater density and hardness than the density and hardness of the ceramic members of the bearing means.

4. In orifice construction, a metering orifice rotor, radial and double thrust bearing means rotatably mounting the rotor, and housing members mounting the bearing means and the housing members including coupling members adapted for connection in a pipe line, and the metering orifice rotor having formed therein a metering orifice bore, the bearing means including members made of fired ceramic material and the rotor being made of fired ceramic material having a greater density and hardness than the density and hardness of the ceramic members of the bearing means.

5. In orifice construction, a metering orifice rotor, radial and double thrust bearing means rotatably mounting the rotor, and housing members mounting the bearing means and the housing members including coupling members adapted for connection in the pipe line, and the bearing means including an internally cylindrical radial bearing tube in which the rotor is rotatable and a thrust bearing ring fitting in the bore at each end of the bearing tube, each thrust bearing ring providing a thrust bearing for one of the ends of the rotor.

6. In orifice construction, the combination set forth in claim 5 and in which the thrust bearing rings have outwardly extending flanges, each flange abutting one end of the bearing tube.

References Cited in the file of this patent

UNITED STATES PATENTS

| Number | Name | Date |
|--------|------|------|
| 1,551,672 | Knollenberg | Sept. 1, 1925 |
| 1,580,558 | McLaine | Apr. 13, 1926 |
| 1,671,580 | Greve | May 29, 1928 |
| 1,882,241 | Curran | Oct. 11, 1932 |
| 1,938,475 | Alexander | Dec. 5, 1933 |
| 2,076,465 | Kirk | Apr. 6, 1937 |
| 2,409,661 | Carter | Oct. 22, 1946 |